(12) United States Patent
Berg et al.

(10) Patent No.: US 11,144,553 B2
(45) Date of Patent: Oct. 12, 2021

(54) STREAMING PROGRAMMABLE POINT MAPPER AND COMPUTE HARDWARE

(71) Applicant: International Business Machines Corporation, Armonk, NY (US)

(72) Inventors: David J. Berg, Los Gatos, CA (US); Andrew S. Cassidy, San Jose, CA (US); Michael V. DeBole, Poughkeepsie, NY (US); Bryan L. Jackson, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 14/954,915

(22) Filed: Nov. 30, 2015

(65) Prior Publication Data
US 2017/0155698 A1    Jun. 1, 2017

(51) Int. Cl.
*G06F 16/2455*    (2019.01)

(52) U.S. Cl.
CPC .............................. *G06F 16/24568* (2019.01)

(58) Field of Classification Search
CPC ... H04N 21/440245; H04N 21/440281; H04N 5/783; H04N 7/52; H04N 9/7925; H04N 9/8042; H04N 21/8455; H04N 21/845; H04N 9/7921; H04N 21/234363; H04N 21/2343; G06F 17/30516; G06F 15/173
See application file for complete search history.

(56) References Cited

U.S. PATENT DOCUMENTS

| | | | |
|---|---|---|---|
| 5,949,918 A * | 9/1999 | McCaffrey | H04N 5/20 382/274 |
| 7,114,174 B1 | 9/2006 | Brooks et al. | |
| 7,194,141 B1 * | 3/2007 | Bao | G06T 3/4023 358/3.26 |
| 7,218,417 B2 | 5/2007 | Lieberman et al. | |
| 7,995,045 B2 | 8/2011 | Dunki-Jacobs | |
| 8,127,058 B1 * | 2/2012 | Sha | H04N 19/44 710/52 |
| 8,392,487 B1 * | 3/2013 | Mesh | G06F 17/16 708/191 |
| 8,866,926 B2 * | 10/2014 | Silverbrook | B41J 11/005 348/222.1 |
| 9,384,218 B2 * | 7/2016 | Charikar | G06F 17/3028 |

(Continued)

FOREIGN PATENT DOCUMENTS

| | | |
|---|---|---|
| CN | 102621143 A | 8/2012 |
| CN | 103916717 A | 7/2014 |
| IN | 0913CHE2010 A | 2/2012 |

OTHER PUBLICATIONS

Liao et al., "Data and Computation Transformations for Brook Streaming Applications on Multiprocessors," Proceedings of the International Symposium on Code Generation and Optimization, Mar. 26-29, 2006, 12 pages.

*Primary Examiner* — Dhairya A Patel
*Assistant Examiner* — Eui H Kim
(74) *Attorney, Agent, or Firm* — Zilka-Kotab, P.C.

(57) ABSTRACT

In one general embodiment, a computer-implemented method is provided. The computer-implemented method includes receiving data comprising at least one data stream. Each data stream of the at least one data stream includes a plurality of points. The computer-implemented method also includes producing a result by remapping the at least one data stream in a point-by-point manner, and outputting the result.

11 Claims, 15 Drawing Sheets

(56) References Cited

U.S. PATENT DOCUMENTS

| | | | | |
|---|---|---|---|---|
| 9,497,457 B1* | 11/2016 | Gupta | .................... | H04N 19/85 |
| 9,697,175 B2* | 7/2017 | Lynch | .................... | G06F 17/10 |
| 2004/0267986 A1* | 12/2004 | Leung | .................... | G06F 13/28 |
| | | | | 710/69 |
| 2010/0111208 A1* | 5/2010 | Tsai | ................... | H04K 1/06 |
| | | | | 375/260 |
| 2013/0050547 A1* | 2/2013 | Blanquart | ............ | H04N 5/3452 |
| | | | | 348/294 |
| 2014/0003539 A1* | 1/2014 | Rodriguez | ..... | H04N 21/440254 |
| | | | | 375/240.25 |
| 2014/0078265 A1 | 3/2014 | Ohba et al. | | |
| 2014/0344227 A1* | 11/2014 | Grube | ................ | G06F 11/1666 |
| | | | | 707/691 |
| 2015/0043015 A1* | 2/2015 | Warren | .............. | G06K 15/1856 |
| | | | | 358/1.2 |
| 2015/0156469 A1* | 6/2015 | Qu | ....................... | H04N 9/8715 |
| | | | | 348/43 |
| 2015/0194987 A1* | 7/2015 | Li | ......................... | H03M 13/13 |
| | | | | 714/752 |
| 2016/0132360 A1* | 5/2016 | Raghavan | ................ | G06F 9/54 |
| | | | | 718/104 |
| 2017/0109109 A1* | 4/2017 | Pugh | ....................... | H03M 7/46 |

* cited by examiner

STREAMING PROGRAMMABLE POINT MAPPER AND COMPUTE HARDWARE

BACKGROUND

The present invention relates to point mapping, and more particularly, this invention relates to streaming programmable point mappers.

Data is commonly received in a format that is not optimal for subsequent processing. For example, data may be collected from various sources, where each of the sources provide the data at different resolutions. Accordingly, in order for the data to be used in a meaningful manner, the data may need to be scaled prior to manipulation. In some cases, the received data may be multi-dimensional, and not all dimensions of the data may be required for processing. Accordingly, in order for the data to be used in an efficient and/or meaningful manner, the dimensionality of the input data may need to be changed prior to manipulation.

Still yet, if the received data is to be provided as input to multiple applications, each of the applications may have different requirements with respect to resolution and/or dimensionality. As a consequence, scaling and dimensionality modifications may need to be performed multiple times for a single unit of data. Any scaling or dimensionality modifications may be configured specifically for the unit of data, based upon a priori knowledge of the data, such as its data type and domain. Thus, the systems configured for scaling data or changing the dimensionality are implemented in a fixed manner that often renders such systems unsuitable for application to other data or processes.

SUMMARY

In one general embodiment, a computer-implemented method is provided. The computer-implemented method includes receiving data comprising at least one data stream. Each data stream of the at least one data stream includes a plurality of points. The computer-implemented method also includes producing a result by remapping the at least one data stream in a point-by-point manner, and outputting the result.

In another general embodiment, a computer program product for programmable point mapping is provided. The computer program product comprises a computer readable storage medium having program instructions embodied therewith. The program instructions are executable by a point mapper to cause the point mapper to receive at least one data stream. Each data stream includes a plurality of points. Moreover, the program instructions are executable by the point mapper to cause the point mapper to produce a result by remapping the at least one data stream in a point-by-point manner, and cause the point mapper to output the result.

In another general embodiment, a system is provided, the system including a plurality of first point mappers configured in parallel. Each of the first point mappers output a data stream including a plurality of points. Moreover, a stream compute unit receives the data streams of the first point mappers.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of a streaming programmable point mapper.

In the various embodiments, a received data stream may be converted to a remapped data stream having at least one of a target resolution and a target dimensionality based on at least one configurable parameter. As an option, the at least one configurable parameter may include a mode. For example, the mode may include duplication or reduction. As another option, the at least one configurable parameter may include mapping instructions. The mapping instructions may, for example, map at least one of points, rows, and dimensions of the data streams to the remapped data streams in the result. The mapping instructions may be encoded or embodied in stored microcode.

In one general embodiment, a computer-implemented method is provided. The computer-implemented method includes receiving data comprising at least one data stream. Each data stream of the at least one data stream includes a plurality of points. The computer-implemented method also includes producing a result by remapping the at least one data stream in a point-by-point manner, and outputting the result.

In another general embodiment, a computer program product for programmable point mapping is provided. The computer program product comprises a computer readable storage medium having program instructions embodied therewith. The program instructions are executable by a point mapper to cause the point mapper to receive at least one data stream. Each data stream includes a plurality of points. Moreover, the program instructions are executable by the point mapper to cause the point mapper to produce a result by remapping the at least one data stream in a point-by-point manner, and cause the point mapper to output the result.

In another general embodiment, a system is provided, the system including a plurality of first point mappers configured in parallel. Each of the first point mappers output a data stream including a plurality of points. Moreover, a stream compute unit receives the data streams of the first point mappers.

Figure 1A:
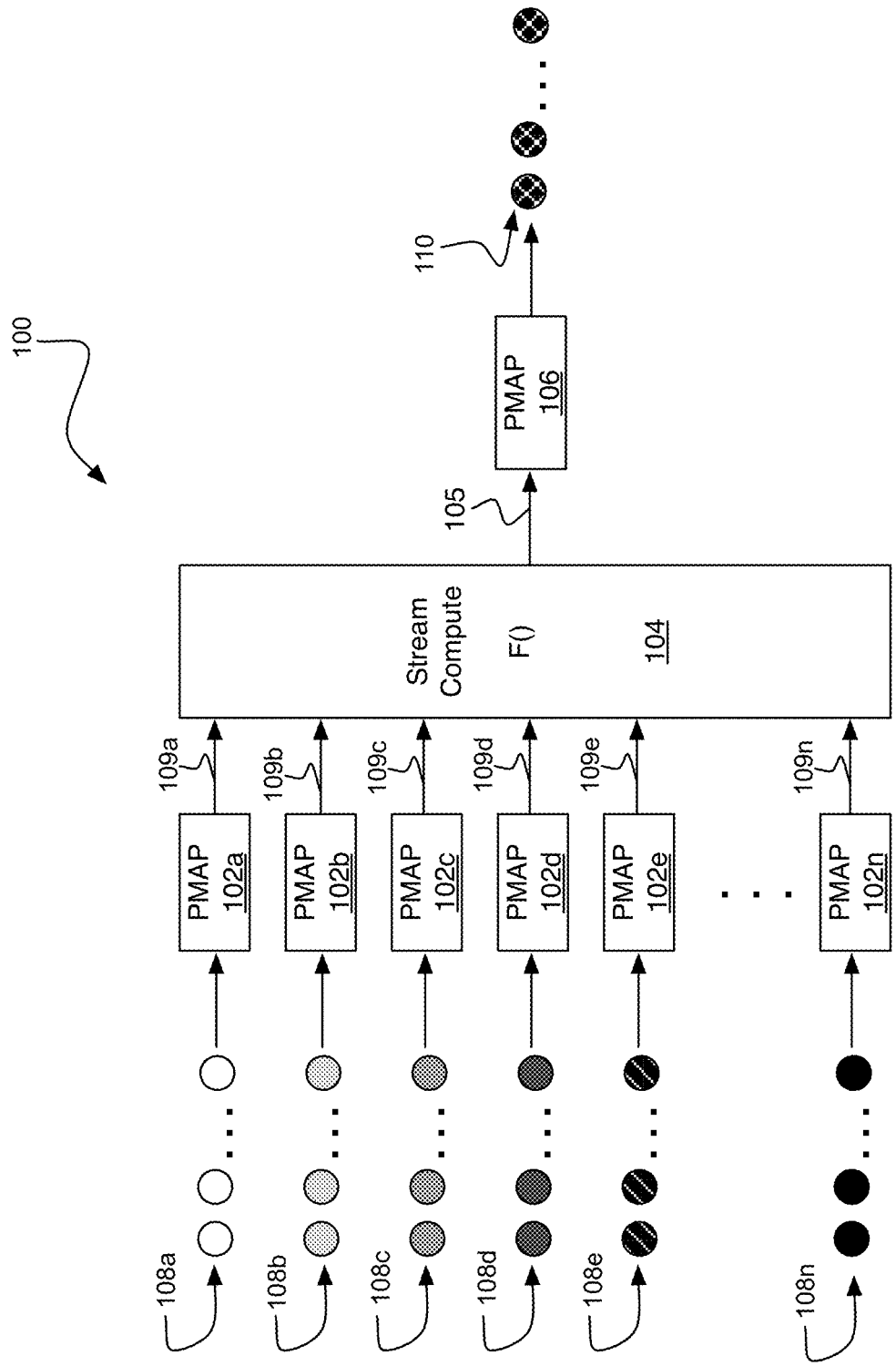
FIGS. 1A-1C illustrate a system for performing streaming programmable point mapping and computation, according to one embodiment.

FIG. 1A depicts a system 100 for performing streaming programmable point mapping and computation, in accordance with one embodiment. As an option, the present system 100 may be implemented in conjunction with features from any other embodiment listed herein, such as those described with reference to the other FIGS. Of course, however, such system 100 and others presented herein may be used in various applications and/or in permutations which may or may not be specifically described in the illustrative embodiments listed herein. Further, the system 100 presented herein may be used in any desired environment.

Figure 1B:
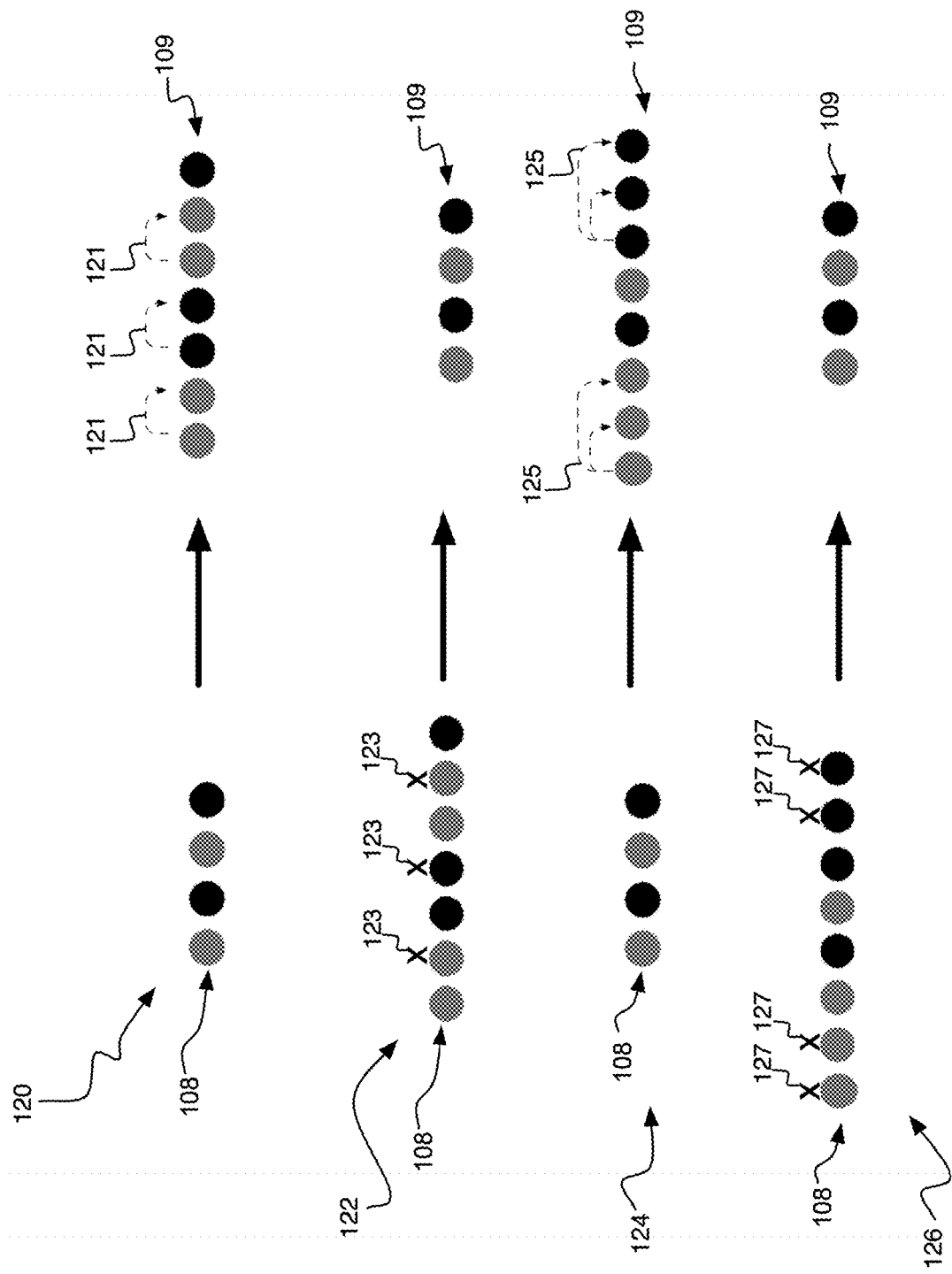

As illustrated in FIG. 1, the system 100 includes a plurality of first point mappers 102 (i.e., point mapper 102a, point mapper 102b, point mapper 102c, point mapper 102d, point mapper 102e . . . point mapper 102n), and a stream compute unit 104. Further, the plurality of point mappers 102 are configured in parallel. Because of the parallel configuration of the point mappers 102, each point mapper 102 is operable to receive a data stream 108 independent of the other point mappers 102.

As shown in FIG. 1, the point mappers 102 receive a plurality of data streams 108. In particular, the point mapper 102a is receiving data stream 108a, the point mapper 102b is receiving data stream 108b, the point mapper 102c is receiving data stream 108c, the point mapper 102d is receiving data stream 108d, the point mapper 102e is receiving data stream 108e, and the point mapper 102n is receiving data stream 108n. The system 100 may be configured to include any number of point mappers 102. For the sake of clarity, the system 100 of FIG. 1 is illustrated as comprising six point mappers 102 receiving six corresponding data streams 108, however it is understood that the system 100 of FIG. 1 may comprise any number of point mappers 102 less than or greater than six.

Each of the data streams 108 may originate from any source that is capable of outputting a data stream 108. In one embodiment, the data streams 108 all originate from the same source. In other embodiments, the data streams 108 originate from two or more different sources. The data of each data stream 108 may be single-dimensional or multi-dimensional. A format, dimensionality, and resolution of the data may depend on the domain of the data.

Examples of data sources include vision data sources, such as CMOS sensors, CCD sensors, etc., the data may be representative of sensitivity (e.g., UV light, visible light, infrared, etc.) or image frames or channels. The data may be include auditory data, such as from microphones (e.g., condenser mic, dynamic mic, carbon mic, etc.), laser or fiber optics, or silicon cochlea. The data may include chemical data, such as adsorption, pH, immunochemical, colorimetric, chromatography, and spectrometry data. The data may include position/orientation data, such as from position encoding, potentiometers, resistive strain gauges, and accelerometers.

Additional examples of data sources include electromagnetic data sources that provide, for example, resistivity or conductance data, magnetic field data, electric field data, photoelectric data, radiation data, etc.; proximity data sources that provide, for example, acoustic data, capacitance data, Hall effect data, etc.; mechanical data sources that provide, for example, flow data, pressure data, force data, temperature data, mass data, density data, velocity data, etc.; and range data sources or distance data sources that provide, for example, LIDAR data, RADAR data, ultrasound data, structured light data, compass data, GPS data, etc.

Still other examples of data sources include imaging sources that provide, for example, x-ray data, CT data, MM data, PET data, ET data, SPECT data, etc.; geographic information system data sources that provide, for example, seismic data, wave height data, temperature data, turbidity data, surface height data, reflectance data, emissivity data, geophone data, hydrophone data; atmospheric data sources that provide, for example, solar influx data, wind data, temperature data, barometric pressure data, humidity data, precipitation data, visibility data, haze data, particulate data, etc.; and human activity data sources that provide, for example, ground traffic data, air traffic data, telecommunications data, global positioning data, internet data, building energetics data, grid data, air quality data, etc.

Each point mapper 102 remaps the received data stream 108 and outputs a resulting data stream 109, also herein referred to as a "result," having a target resolution and/or a target dimensionality. As specifically illustrated in FIG. 1, the point mapper 102a outputs the resulting data stream 109a based on a remapping of the data stream 108a, the point mapper 102b outputs the resulting data stream 109b based on a remapping of the data stream 108b, the point mapper 102c outputs the resulting data stream 109c based on a remapping of the data stream 108c, the point mapper 102d outputs the resulting data stream 109d based on a remapping of the data stream 108d, the point mapper 102e outputs the resulting data stream 109e based on a remapping of the data stream 108e, and the point mapper 102n outputs the resulting data stream 109n based on a remapping of the data stream 108n. In one embodiment, each point mapper 102 may perform the remapping based on at least one configurable parameter.

Accordingly, in various embodiments, each of the data streams 108 and the data streams 109 may include a plurality of points. As used herein, a data point may comprise any discrete element in a data set, such as a data stream. The data representing a point may be application dependent, and encoded into a bit-representation. The points of the data streams 108 may comprise lines or portions of lines, such as lines of a frame, or frames of a sequence of frames. The data streams 108 received by the point mappers 102 may be in the same resolution, or at different resolutions As used herein, remapping a data stream may include any operation that adds, removes, duplicates, or otherwise modifies the points contained in the data stream. In one embodiment, remapping a data stream may include an upsample operation. The upsample operation may include the application of an interpolation or nearest neighbor algorithm, wherein a target point is a duplicate of a nearby point in (X,Y) (i.e., $P_{Target} = P_{Source(x,y)}$). The nearby point may be duplicated N-times, depending on target resolution, and dimensions. For example, referring to FIG. 1B, an upsample operation 120 illustrates that a plurality of points in a data stream 108 are duplicated 121 to neighboring locations in the X direction of a resulting data stream 109.

In another embodiment, remapping a data stream may include a downsample operation. The downsample operation may include the application of an interpolation or nearest neighbor algorithm, wherein a target point is a nearby point in (X,Y) (i.e., $P_{Target} = P_{Source(x,y)}$). In particular, the target point is the nearby source point (X,Y), and remaining points are removed from output. For example, referring to FIG. 1B, a downsample operation 122 illustrates that multiple points in a data streams 108 are removed 123 ('x') during remapping from the resulting data stream 109.

In yet another embodiment, remapping a data stream may include a border fill operation. The border fill operation may include the application of a nearest neighbor algorithm, wherein points at (X,Y) are duplicated. For example, referring to FIG. 1B, a border fill operation 124 illustrates that one or more points in the data stream 108 are duplicated 125 to create one or more copies of the respective points in the resulting data stream 109. Still yet, remapping a data stream may include a crop operation. As a result of a crop operation, points at (X,Y) may be removed. For example, referring to FIG. 1B, a crop operation 126 illustrates that one or more points in the data stream 108 are removed 127 ('x') from the resulting data stream 109. Accordingly, each point mapper 102 performs some type of point selection function.

The remapping of the data streams 108 by the point mappers 102 may be performed based on programmable instructions or microcode stored in a programmable instruction memory, as described in more detail below. Moreover, the remapping performed on a data stream 108 may comprise a point-to-point computation that maps input points in the data stream 108 of a first dimension (D) and/or first resolution (R) to output points of a resulting data stream 109 having a second dimension (D') and/or resolution (R').

It is contemplated that in some embodiments, the data streams 108 may comprise the data streams 109, such that the data streams 109 are received at the stream compute unit 104 directly from a data bus. In these embodiments, the data streams received from the bus may not undergo any point selection or sub-sampling.

Figure 1C:
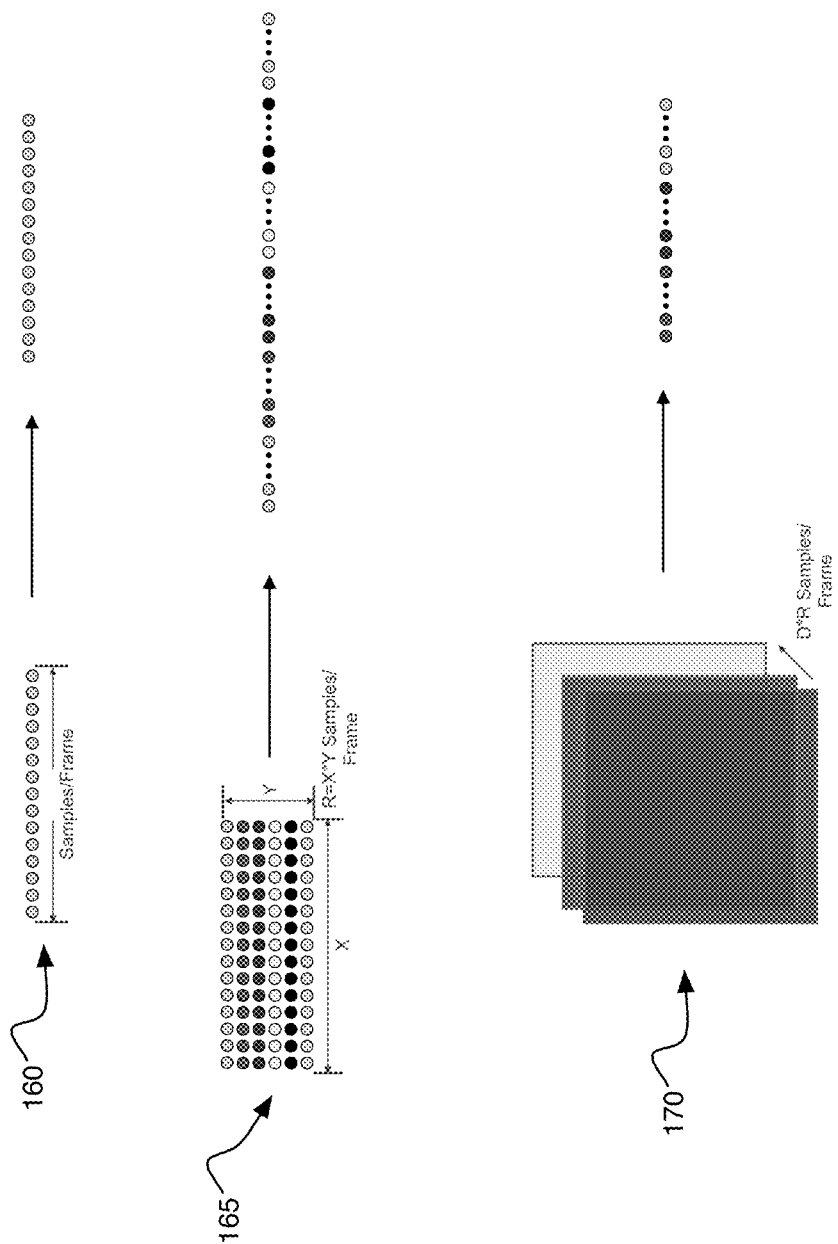

FIG. 1C conceptually illustrates how multi-dimensional data may be converted into a streaming point source. For example, one-dimensional point source 160 is shown to comprise a plurality of samples or points per frame. The one-dimensional point source 160 may be considered to be a native streaming point source. However, the two-dimensional point source 165 may be scanned and modified for conversion to a streaming point source. As shown, the two-dimensional point source comprises R=X*Y samples or points per frame. Still yet, a multi-dimensional point source 170 is illustrated to comprise D*R samples or points per frame, where D is the dimensionality, as noted above. The multi-dimensional point source 170 may be scanned and modified for conversion to a streaming point source. The streaming point sources may subsequently be received by a point mapper 102, and the point mapper 102 may remap the data stream, as described in further detail below.

In one embodiment, a point mapper 102 may perform one-to-one mapping on the incoming data streams 108, such that the dimensionality and resolution of the resulting data stream 109 matches the dimensionality (D) and resolution (R) of the received data stream 108. In the context of the below description, a data stream $S_i$ comprises a sequence of points $\{S_0, S_1, S_2, S_3 \ldots SD*R\}$ as a series of samples having a total length of D*R; the number of streams is defined as n; a scaling factor for dimensionality is defined as p; and a scaling factor for rows is defined as q. Accordingly, for a one-to-one mapping, the output stream $(S_{out})$=F $(S_0, S_1 \ldots S_{n-1})$, where F( ) is applied at the stream compute unit 104.

In another embodiment, a point mapper 102 performs a one-to-many mapping on an incoming data stream 108, such that the dimensionality of the resulting data stream 109 equals pD, and the resolution of the result equals qR. Accordingly, the output stream $(S_{out})$=F(G($S_0$), G($S_1$) ... G($S_{n-1}$)), where $S_i$ a streaming sequence of points of varying lengths, G( ) is a function applied to an incoming point stream to increase the number of points within that stream, and F( ) is the function applied to the points across the data streams, where each data stream contains the same number of points after G( ) has been applied.

In another embodiment, a point mapper 102 performs a many-to-one mapping on an incoming data stream 108, such that the dimensionality of the resulting data stream 109 equals D/p, and the resolution of the resulting data stream 109 equals R/q. Accordingly, the output stream $(S_{out})$=F(H($S_0$), H($S_1$) ... H($S_{n-1}$)), where $S_i$ is a streaming sequence of points of varying lengths, H( ) is a function applied to an incoming point stream to reduce the number of points within that stream, and F( ) is the function applied to the points across the data streams, where each data stream contains the same number of points after H( ) has been applied, and F( ) is applied at the stream compute unit 104.

In yet another embodiment, point mappers 102 perform a hybridization of one-to-one, one-to-many, and/or many-to-one mappings on incoming data streams 108. For example, a first point mapper 102 may receive a first data stream 108 at a resolution or dimensionality greater than a target resolution or target dimensionality, and a second point mapper 102 may receive a second data stream 108 at a resolution or dimensionality less than the target resolution or the target dimensionality. Accordingly, the result or output stream $(S_{out})$=F(G($S_0$), $S_1$ ... H($S_{n-1}$)), where $S_1$ is a streaming sequence of points of varying lengths, G( ) or H( ) is a function applied to an incoming point stream to increase or reduce, respectively, the number of points within that stream so that all resulting data streams 109 include an equal number of points, and F( ) is the function applied (at the stream compute unit 104) to the points across the data streams 109, where each data stream 109 contains the same number of points after G( ) or H( ) has been applied.

Figure 2A:
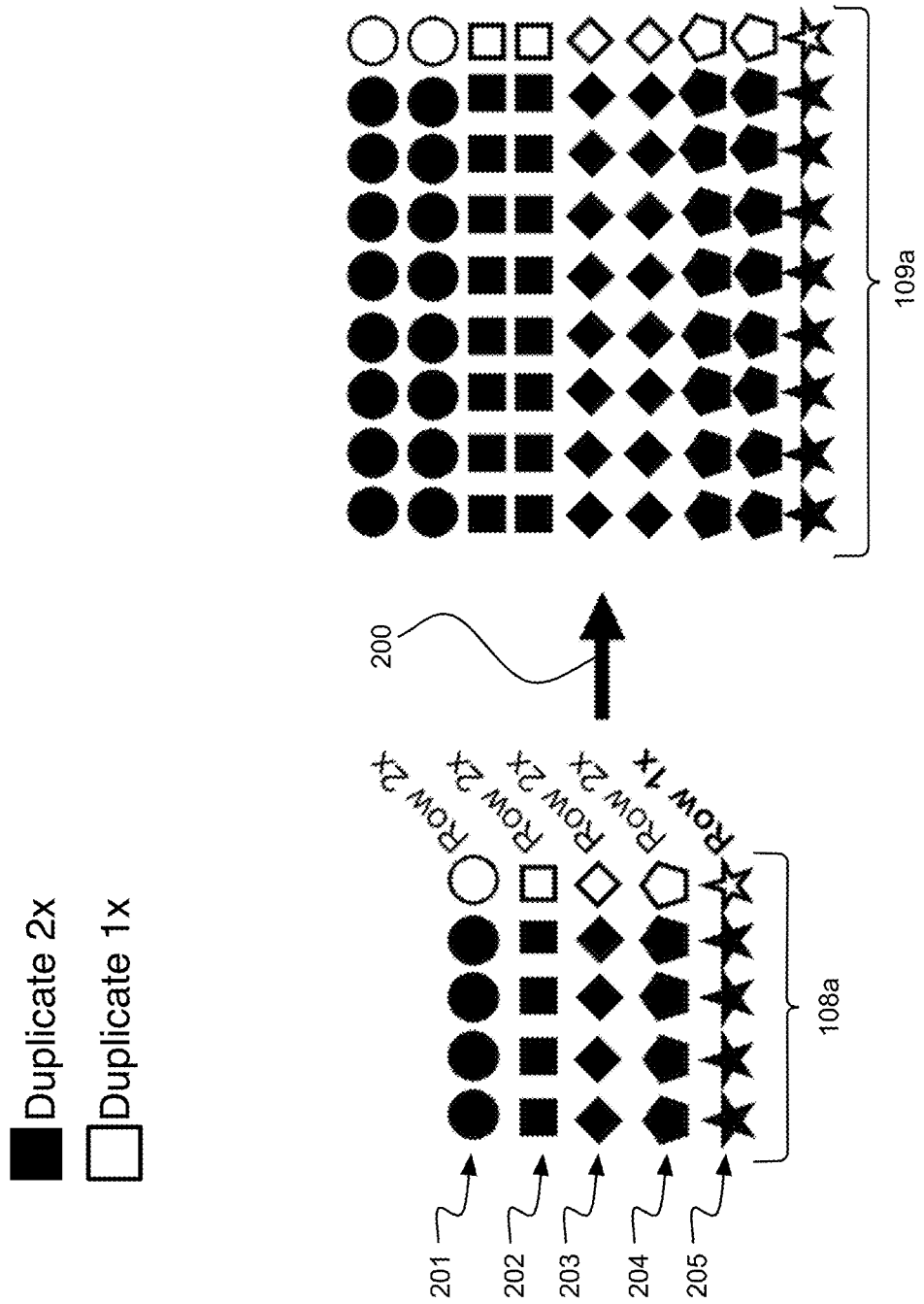
FIGS. 2A-2B illustrate the remapping of input points of a data stream in a point-by-point manner to a resulting data stream having a target dimension and/or target resolution, according to one embodiment.
Figure 2B:
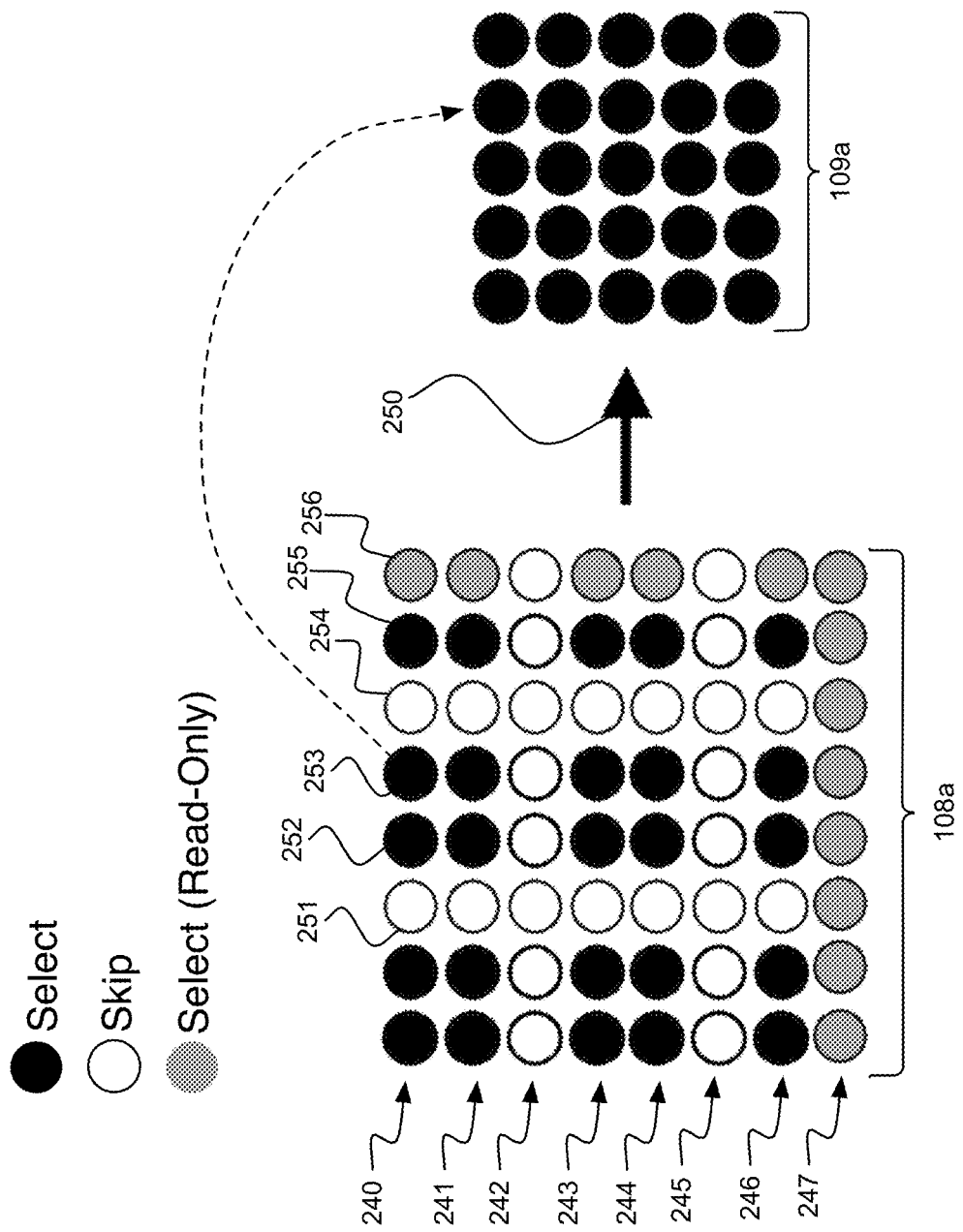

For example, referring now to FIGS. 2A-2B, input points of data streams having a first dimension and/or resolution are remapped in a point-by-point manner to output points of a resulting data stream having a target dimension and/or target resolution, in accordance with one embodiment. As an option, application of point remapping operations 200 and 250 may be implemented in conjunction with features from any other embodiment listed herein, such as those described with reference to the other FIGS. Of course, however, such point remapping operations 200 and 250 and others presented herein may be used in various applications and/or in permutations which may or may not be specifically described in the illustrative embodiments listed herein. Further, the point remapping operations 200 and 250 presented herein may be used in any desired environment.

In one embodiment, the remapping of a data stream may proceed based on instructions. Further, the instructions may be formatted as shown in Table 1.

TABLE 1

| | Read-Only | Loop Count | Duplicate Count |
|---|---|---|---|
| Bits: | 1 | N | M |

As shown in Table 1, each instruction is formatted to include three instruction fields: Read-Only, Loop Count, and Duplicate Count. The instructions of Table 1 may be used for one-to-many remapping operations. Each instruction may indicate the points of a data stream that are to be selected and mapped in a resulting data stream. In some embodiment, each instruction may be embodied as a line of microcode. Accordingly, in various embodiments, remapping operations may be performed based on the contents of a microcode memory or the contents of a programmable instruction memory. The microcode memory or programmable instruction memory may provide for the run-time configuration of a remapping operation. Moreover, the mapping parameters may be computed offline. The instructions for a remapping operation may be coded for groups of points, with the coding efficiency determined by a desired mapping. In this way, the microcode may allow the on-demand configuration of an arbitrary mapping, rather than having the point mapping be fixed within hardware. (X, Y, Z . . . ) coordinates may be implicit to a given point, but remap instructions may be generated based on this consideration.

Referring back to Table 1, a bit may be set (e.g., '1') in the Read-Only field to indicate that a read operation should be performed on a selected input unit of a data stream, but the input unit should not be moved or duplicated to a resulting data stream. In one embodiment, the input unit comprise a point in a data stream, however, in other embodiments, each input unit may comprise a row, frame, n-dimensional source, etc., where each row, frame, n-dimensional source, etc. comprises a plurality of points. The value N in the Loop Count field indicates how many times to execute the instruction before incrementing an instruction pointer. In other words, the value N in the Loop Count field indicates how many input units the instruction applies to. Finally, the value M in the Duplicate Count field indicates a number of input units to duplicate before moving to the next input unit. In other words, the value M in the Duplicate Count field indicates how many times the instruction will be applied for a particular set of input units, or how many times the particular set of input units will be duplicated to an output.

Referring now to FIG. 2A, a one-to-many point remapping operation 200 is applied to a data stream 108a for generating a resulting data stream 109a based on the instructions of Tables 2 and 3. As shown in FIG. 2A, the data stream 108a is represented by rows 201-205 of geometric shapes, and each point in the data stream 108a is represented by a single geometric shape.

Specifically, the data stream 108a is shown to include a row 201 of circles, where each circle is a point in the data stream 108a; a row 202 of squares, where each square is a point in the data stream 108a; a row 203 of diamonds, where each diamond is a point in the data stream 108a; a row 204 of pentagons, where each pentagon is a point in the data stream 108a; and a row 205 of stars (concave decagons), where each star is a point in the data stream 108a.

Still yet, the remapping operation 200 performed on the data stream 108a to generate the resulting data stream 109a is a one-to-many mapping function that upsamples a two-dimensional (2D) data source. Specifically, the remapping operation 200 is shown to map a 5×5 data source to a 9×9 target. The remapping operation 200 may be performed based on pre-determined instructions stored in microcode memory or an instruction memory.

In one embodiment, the pre-determined instructions may comprise both X-dimension instructions for scaling each data stream 108 in a first dimension, and Y-dimension instructions for scaling each data stream 108 in a second dimension. Illustrative X-dimension instructions and Y-dimension instructions are shown in Table 2 and Table 3, respectively, in accordance with the instruction format of Table 1.

Because the remapping operation 200 is mapping a 5×5 data source to a 9×9 target, each row of the data stream 108a includes one point that is only going to be duplicated once in the X-dimension. Similarly, the row 205 will only be duplicated once in the Y-dimension from the data stream 108a to the resulting data stream 109a. For purposes of clarity, points of the data stream 108a that will be duplicated in the X-dimension more than once are filled solid black, and points of the data stream 108a that will not be duplicated more than once in the X-dimension are stroked or outlined black, without a fill.

TABLE 2

| X-dimension instructions |
| --- |
| 0, 3, 1 |
| 0, 0, 0 |
| 0XFFFFFF |

The instructions for the remapping operations 200 and 250 of FIGS. 2A-2B are presented herein as being 0-indexed, such that a 0 value in the Loop Count or Duplicate Count fields of Tables 2 and 3 causes the performance of a single instance of duplication (i.e., 1-to-1), a 1 value in the Loop Count or Duplicate Count fields causes the performance of two instances of duplication (i.e., 2-to-1), a 2 value in the Loop Count or Duplicate Count fields causes the performance of three instances of duplication (i.e., 3-to-1), etc.

In view of this, the '0, 3, 1' instruction of Table 2 directs a duplication command (i.e., Read-Only field=0), for the next four input units (i.e., Loop Count field=3), and each of the next four input units is duplicated twice (i.e., Duplicate Count field=1). Accordingly, based on the '0, 3, 1' instruction, remapping operation 200 has twice duplicated each of the four left-most points (solid black circles) of the row 201 in the resulting data stream 109a.

After completing the '0, 3, 1' instruction, the next instruction in Table 2 is read and performed. As shown in Table 2, the next instruction is provided as '0, 0, 0'. The '0, 0, 0' instruction of Table 2 directs a duplication command for the next received input unit, or the final point (outlined circle) of the row 201. In particular, the '0, 0, 0' instruction of Table 2 instructs duplication (i.e., Read-Only field=0), for a single input unit (i.e., Loop Count field=0), and the single input unit is duplicated once (i.e., Duplicate Count field=0). Accordingly, based on the '0, 0, 0' instruction, remapping operation 200 has once duplicated the final point (outlined circle) of the row 201 to the resulting data stream 109a.

After completing the '0, 0, 0' instruction, the next instruction in Table 2 is read and performed. As shown in Table 2, the next instruction comprises an end of instruction indicator. Specifically, as illustrated in Tables 2-3, the end of instruction indicator comprises a value of '0XFFFFFF'. Upon reaching an end of instruction indicator, an instruction pointer may return to the first instruction. The end of instruction indicator may be used to signal the completion of processing for a particular frame or set of points for a frame. Accordingly, in response to reaching the end of instruction indicator, the microcode may return back to the start and accept a next frame or set of points for a frame. For example, each frame may be received in a stream of images received over time.

TABLE 3

| Y-dimension instructions |
| --- |
| 0, 3, 1 |
| 0, 0, 0 |
| 0XFFFFFF |

Still yet, Table 3 includes the microcode instructions for scaling, in the Y-dimension, the data stream 108a by the remapping operation 200. As shown, the instructions of Table 3 are identical to the instructions in Table 2, described above. As a result, the scaling performed by the remapping operation 200 may be symmetric across the X- and Y-dimensions.

For example, the first instruction ('0, 3, 1') of Table 3 directs a duplication command (i.e., Read-Only field=0), for the next four input units (i.e., Loop Count field=3), and each of the next four input units is duplicated twice (i.e., Duplicate Count field=1). Accordingly, based on the '0, 3, 1' instruction, mapping function 200 has twice duplicated each of the first four rows 201-204 of the data stream 108a to the resulting data stream 109a.

After completing the '0, 3, 1' instruction, the next instruction in Table 3 is read and performed. As shown in Table 3, the next instruction is provided as '0, 0, 0'. The '0, 0, 0' instruction of Table 3 directs a duplication command for the next received input unit, which, in the case of the Y-dimension, is a row of points. In particular, the '0, 0, 0' instruction of Table 3 instructs duplication (i.e., Read-Only field=0), for a single input unit (i.e., Loop Count field=0), and the single input unit is duplicated once (i.e., Duplicate Count field=0). More specifically, the '0, 0, 0' instruction of Table 3 instructs the duplication of the row 205 (i.e., row of stars) of the data stream 108a such that the remapping operation 200 once duplicates in the Y-dimension the row 205 to the resulting data stream 109a.

As described, because the Y-dimension instructions are processed after the X-dimension instructions, the Y-dimension instructions are applied to the output of the X-dimension processing. It is contemplated, however, that the processing of data dimensionality may occur in any desired order.

After completing the '0, 0, 0' instruction, the next instruction in the table is read and performed. As shown in Table 3, the next instruction, '0XFFFFFF', comprises an end of instruction indicator, which has been described above.

In this manner, the remapping operation 200 may be performed on at least one data stream 108 in a point-by-point manner.

In yet another embodiment, a many-to-one remapping operation may be performed. In such an embodiment, instructions for the remapping operation may be formatted as shown in Table 4.

TABLE 4

| | Read-Only | Loop Count | Offset (Skip Count) |
|---|---|---|---|
| Bits: | 1 | N | M |

As shown in Table 4, each instruction is formatted to include three instruction fields: Read-Only, Loop Count, and an Offset (Skip Count). Each instruction may indicate the points of a data stream that are to be selected and mapped. In some embodiment, each instruction may be embodied as a line of microcode.

The Read-Only and Loop Count fields are substantially identical to the corresponding fields described above in the context of Table 1. The value M in the Offset field indicates a number of input units to skip before selecting an input unit for outputting in the resulting data stream 109a. For a one-dimensional data stream, each input unit may comprise a point, for a two-dimensional data stream, each input unit may comprise an entire one-dimensional row of points, etc. The Read-Only field indicates to select an input unit, but not to pass on the selected input unit as output. This may be used, for example, to avoid selecting and outputting points (e.g., pixels, etc.) at the end of a row (X-dimension), or an entire row of pixels (Y-dimension). Accordingly, the Read-Only field may provide different functionality from the Offset (Skip Count) field, which selects a pixel after applying the offset, as described in further detail below.

Referring now to FIG. 2B, a many-to-one point remapping operation 250 is applied to a data streams 108a for generating a resulting data stream 109a based on the instructions of Tables 5 and 6. As shown in FIG. 2B, the data stream 108a is represented by rows 240-247 of circles. Moreover, each point in a given row of the data stream 108a is represented by a single circle. Specifically, the input data stream 108a comprises the eight rows 240-247, and each row is shown to comprise eight points (e.g., eight circles).

The remapping operation 250 performed on the data stream 108a is a many-to-one remapping operation that downsamples a two-dimensional (2D) data source. Specifically, the remapping operation 250 is shown to remap a 8×8 data source to a 5×5 target. Accordingly, the input of the remapping operation 250 has a different resolution than the output of the remapping operation 250. The remapping operation 250 may be performed based on pre-determined instructions stored in microcode memory or an instruction memory.

Illustrative X-dimension instructions and Y-dimension instructions are shown in Table 5 and Table 6, respectively, in accordance with the instruction format of Table 3.

Because the remapping operation 250 is mapping a 8×8 data source to a 5×5 target, the data stream 108a includes points that will not be present in the resulting data stream 109a. For the purpose of clarity, points of the data stream 108a of FIG. 2B that will be selected for duplication in the result 109a are filled solid black, points of the data stream 108a that will be skipped are stroked or outlined black, without a fill, and points of the data stream 108a that will be selected (read-only) are filled grey with a black outline. In the context of the present description of FIG. 2B, every third point, in both the X- and Y-dimensions, of the data streams 108a will be skipped.

TABLE 5

| X-dimension instructions |
|---|
| 0, 1, 0 |
| 0, 0, 1 |
| 0, 0, 0 |
| 0, 0, 1 |
| 1, 0, 0 |
| 0XFFFFFF |

The first instruction of Table 4 ('0, 1, 0') directs a duplication command (i.e., Read-Only field=0), for the next two input units (i.e., Loop Count field=1), and no input units are skipped (i.e., Offset (Skip Count) field=0). Accordingly, based on the '0, 1, 0' instruction, remapping operation 250 has once duplicated each of the two left-most points (solid black circles) of the row 240 to the resulting data stream 109a.

After completing the '0, 1, 0' instruction, the next instruction in Table 5 is read and performed. As shown in Table 5, the next instruction is provided as '0, 0, 1'. The '0, 0, 1' instruction of Table 5 directs the skipping of the next received input unit, which is point 251 of the data stream 108a. In particular, the '0, 0, 1' instruction of Table 5 directs duplication (i.e., Read-Only field=0), for a single input unit (i.e., Loop Count field=0), however the next input unit is skipped (i.e., Offset (Skip Count) field=1). Accordingly, based on the '0, 0, 1' instruction, the remapping operation 250 skips duplicating the point 251 to the resulting data stream 109a, but selects the point 252 of the data stream 108a and duplicates the point 252 to the data stream 109a.

After completing the '0, 0, 1' instruction, the next instruction in Table 5 is read and performed. As shown in Table 5, the next instruction comprises a '0, 0, 0' instruction. The '0, 0, 0' instruction of Table 5 is associated with the next received input unit, which is point 253 of the data stream 108a. The '0, 0, 0' instruction instructs duplication (i.e., Read-Only field=0), for a single input unit (i.e., Loop Count field=0). Thus, based on the '0, 0, 0' instruction, the remapping operation 250 selects the point 253 of the data stream 108a and duplicates the point 253 once within the data stream 109a.

Next, the fourth instruction in Table 5 is read and performed. As shown in Table 5, the fourth instruction is provided as '0, 0, 1'. Again, the '0, 0, 1' instruction instructs the skipping of the next received input unit, which is point 254 of the data stream 108a. In particular, the '0, 0, 1' instruction directs duplication (i.e., Read-Only field=0), for a single input unit (i.e., Loop Count field=0), however the next input unit is skipped (i.e., Offset (Skip Count) field=1). Accordingly, based on the '0, 0, 1' instruction, the remapping operation 250 skips duplicating the point 254 in the result 109a, but selects the point 255 of the data stream 108a and duplicates the point 255 to the data stream 109a.

Next, the fifth instruction in Table 5 is read and performed. As shown in Table 5, the fifth instruction is provided as '1, 0, 0'. In particular, the '1, 0, 0' instruction instructs that a read-only operation will be performed (i.e., Read-Only field=1), for a single input unit (i.e., Loop Count field=0). Accordingly, based on the '1, 0, 0' instruction, the remapping operation 250 selects or reads the point 256, but then discards the point 256. Discarding an input unit comprises any operation that results in the input unit not appearing in the result. Accordingly, the point 256 is not included in the resulting data stream 109a.

Finally, the sixth instruction in Table 5 is read and performed. In particular, the sixth instruction of Table 5 comprises an end of instruction indicator, as described previously.

TABLE 6

| Y-dimension instructions |
| --- |
| 0, 1, 0 |
| 0, 0, 1 |
| 0, 0, 0 |
| 0, 0, 1 |
| 1, 0, 0 |
| 0XFFFFFF |

Still yet, Table 6 includes the microcode instructions for scaling, in the Y-dimension, the data stream 108a by the remapping operation 250. As shown, the instructions of Table 6 are identical to the instructions in Table 5, described above. As a result, the scaling performed by the remapping operation 250 may be symmetric with respect to the X- and Y-dimensions.

The first instruction of Table 6 ('0, 1, 0') directs a duplication command (i.e., Read-Only field=0), for the next two input units (i.e., Loop Count field=1), and no input units are skipped (i.e., Offset (Skip Count) field=0). Accordingly, based on the '0, 1, 0' instruction, remapping operation 250 has once duplicated (or moved) the points present in each of the first two input units (rows 240 and 241) to the resulting data stream 109a.

After completing the '0, 1, 0' instruction, the next instruction in Table 6 is read and performed. As shown in Table 6, the next instruction is provided as '0, 0, 1'. The '0, 0, 1' instruction of Table 6 directs the skipping of the next received input unit, which is the row 242. In particular, the '0, 0, 1' instruction of Table 6 directs duplication (i.e., Read-Only field=0), for a single input unit (i.e., Loop Count field=0), however the next input unit is skipped (i.e., Offset (Skip Count) field=1). Accordingly, based on the '0, 0, 1' instruction, and because this instruction is operable in the Y-dimension, the remapping operation 250 skips duplicating any points from the row 242 to the resulting data stream 109a, but selects and duplicates to the result 109a the points of the row 243 that have not been removed due to X-dimension instructions.

After completing the '0, 0, 1' instruction, the next instruction in Table 6 is read and performed. As shown in Table 6, the next instruction comprises a '0, 0, 0' instruction. The '0, 0, 0' instruction of Table 6 is associated with the next received input unit, which is the row 244. The '0, 0, 0' instruction instructs duplication (i.e., Read-Only field=0), for a single input unit (i.e., Loop Count field=0). Thus, based on the '0, 0, 0' instruction, the remapping operation 250 selects and duplicates to the resulting data stream 109a the points of the row 244 that have not been removed due to X-dimension instructions.

Next, the fourth instruction in Table 6 is read and performed. As shown in Table 6, the fourth instruction is provided as '0, 0, 1'. This instruction instructs the skipping of the next received input unit, which is the row 245. In particular, the '0, 0, 1' instruction directs duplication (i.e., Read-Only field=0), for a single input unit (i.e., Loop Count field=0), however the next input unit is skipped (i.e., Offset (Skip Count) field=1). Accordingly, based on the '0, 0, 1' instruction, and because this instruction is operable in the Y-dimension, the remapping operation 250 skips duplicating any points of the row 245 to the resulting data stream 109a, but selects and duplicates to the result 109a the points of the row 246 that have not been removed due to X-dimension instructions.

Next, the fifth instruction in Table 6 is read and performed. As shown in Table 6, the fifth instruction is provided as '1, 0, 0'. In particular, the '1, 0, 0' instruction instructs that a read-only operation will be performed (i.e., Read-Only field=1), for a single input unit (i.e., Loop Count field=0). Accordingly, based on the '1, 0, 0' instruction, the remapping operation 250 selects or reads the next input unit (i.e., row 247), but then discards the input unit (i.e., row 247). Accordingly, points of the row 247 are not included in the resulting data stream 109a.

Finally, the sixth instruction in Table 6 is read and performed. In particular, the sixth instruction of Table 6 comprises an end of instruction indicator, as described previously.

In various embodiments, a remapping operation may first operate on the data in a first dimension, and then operate on the remaining data in a second dimension. For example, in the context of FIG. 2B, the remapping operation 250 may first generate a data set having the dimensions of 5×8 based on the X-dimension instructions, and then further reduce a size of the data set for the result based on the Y-dimension instructions.

Accordingly, by way of the embodiments described above, a mapping function may be configured, based on microcode instructions, to resize a given data set to a target size that conforms with any arbitrary dimensionality and resolution targets. Further, because the instructions for the mapping function may be configured by a user at any time, how points are selected for inclusion in an output stream is completely user-programmable. Moreover, because of the high degree of configurability of the remapping operations, the target dimensionality and resolution do not need to conform to a precise power (e.g., a power of 2).

Referring back to FIG. 1A, resulting data streams 109 are then output from the point mappers 102 to the stream compute unit 104. The stream compute unit 104 receives the data streams 109 and produces output stream 105 by performing a function, F( ), on the data streams 109. The function performed on the data streams 109 may include any applicable function. For example, the function performed on the data streams may include a differencing function, an edge extraction function, a smoothing function, a pass-through function, etc.

Still yet, the stream compute unit 104 outputs the output stream 105 that is generated based on the performed function. In one embodiment, the output stream 105 may be received by a point mapper 106. The point mapper 106 may be configured to remap the output stream 105 and output final output 110 having a target resolution and/or a target dimensionality. In this manner, the point mapper 106 may operate to perform a subsampling operation on the output stream 105. As discussed previously, the point mapper 106 may perform some type of point selection function, such as a crop operation, an upsample operation, a downsample operation, a border fill operation etc.

In another embodiment, the output stream 105 may not be remapped, such that the output stream 105 comprises the final output 110, and no point mapper 106 is utilized.

Accordingly, by way of the embodiments described above, the system 100 may receive data from different data sources, which may provide the respective data at different resolutions, and the system 100 may convert the resolution of the various data sets in a manner that enables the performance of operations across data sources. Still yet, the data may be multi-dimensional, although not all dimensions may be required for a given operation. Further, some data may not have the necessary dimensionality for an operation to be performed in combination with one or more other multi-dimensional data sources. Accordingly, the system 100 may change the dimensionality of an input data stream so that it meets any operational needs.

Still yet, an application or algorithm may have requirements for data dimensionality and resolution, and the source data resolution and/or dimensionality may differ substantially from the requirements. Accordingly, a target resolution for computation may depend on algorithm requirements. The system 100 may provide a highly-configurable system for mapping the data streams of input sources to data streams for output sources based on the requirements of the application or algorithm.

Figure 3:
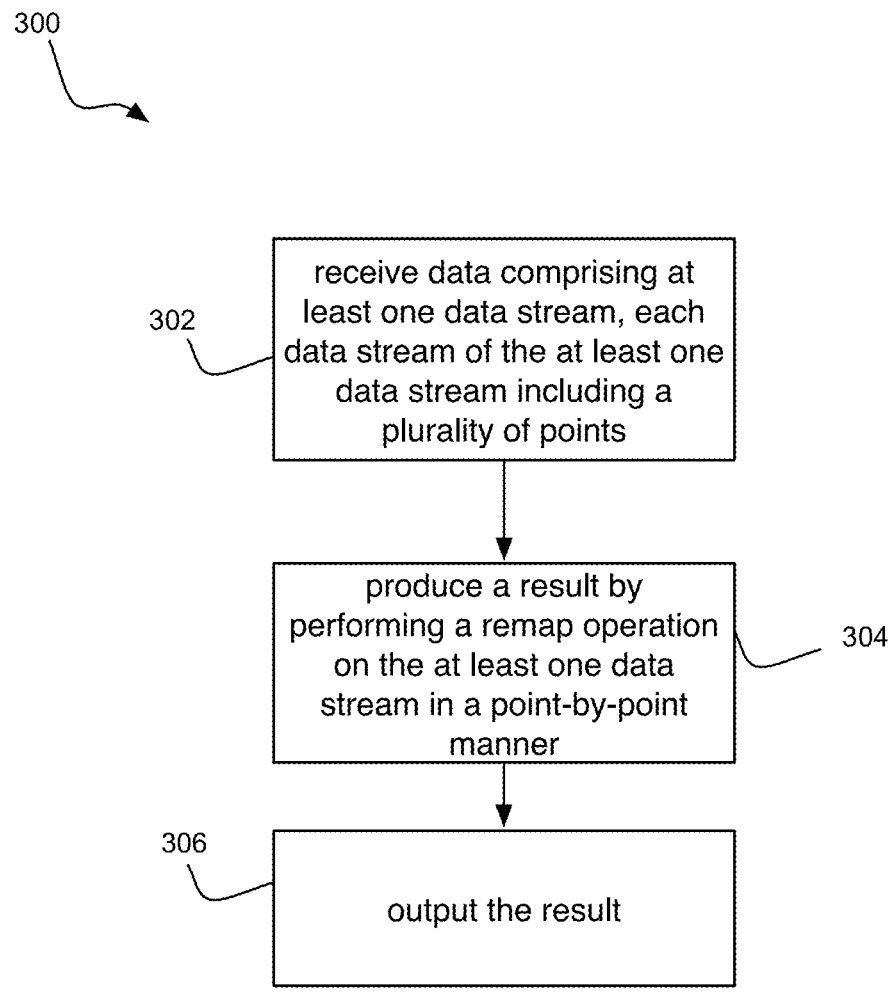
FIG. 3 illustrates a method for performing streaming programmable point mapping, according to one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a point mapper, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 initiates with operation 302, where data comprising at least one data stream is received. Further, each data stream of the at least one data stream includes a plurality of points. For example, the at least one data stream may comprise one or more of the data streams 108 described in the context of FIGS. 1-2. As an option, each of the data streams have the same dimension. For example, each of the data streams may have a same number of points or samples, a same number of rows, a same number of frames, etc. As another option, each of the data streams may be of the same resolution. As yet another option, two or more of the data streams have different dimensions and/or resolutions. For example, two or more of the data streams may have a different number of points or samples, a different number of rows, a different number of frames, etc.

Additionally, at operation 304, a result is produced by performing a remap operation on the at least one data stream in a point-by-point manner. As an option, the remap operation performed on the data streams may be performed based on microcode instructions or instructions in a programmable instruction memory. In one embodiment, the remap operation performed on the data streams comprises a point-to-point computation that maps input points in the received data streams of a first dimension (D) and/or first resolution (R) to output points of the result having a second dimension (D') and/or resolution (R'), as discussed above.

In this manner, each received data stream may be converted to a remapped data stream having at least one of a target resolution and a target dimensionality based on at least one configurable parameter. As an option, the at least one configurable parameter may include a mode. For example, the mode may include duplication or reduction. As another option, the at least one configurable parameter may include mapping instructions. The mapping instructions may, for example, map at least one of points, rows, and dimensions of the data streams to the remapped data streams in the result. The mapping instructions may be encoded or embodied in stored microcode.

Moreover, the result is output at operation 306. In some embodiments, the result may received by a stream compute unit for further processing, as described above. As previously noted, the result may be output at a resolution and/or dimensionality, that is the same as or different than the resolution and/or dimensionality of any of the received data streams.

FIG. 4A-4I depict block diagrams of the architecture of a point mapper 102, in accordance with various embodiments. As an option, the present point mapper 102 may be implemented in conjunction with features from any other embodiment listed herein, such as those described with reference to the other FIGS. Of course, however, such point mapper 102 and others presented herein may be used in various applications and/or in permutations which may or may not be specifically described in the illustrative embodiments listed herein. Further, the point mapper 102 presented herein may be used in any desired environment.

Figure 4A:
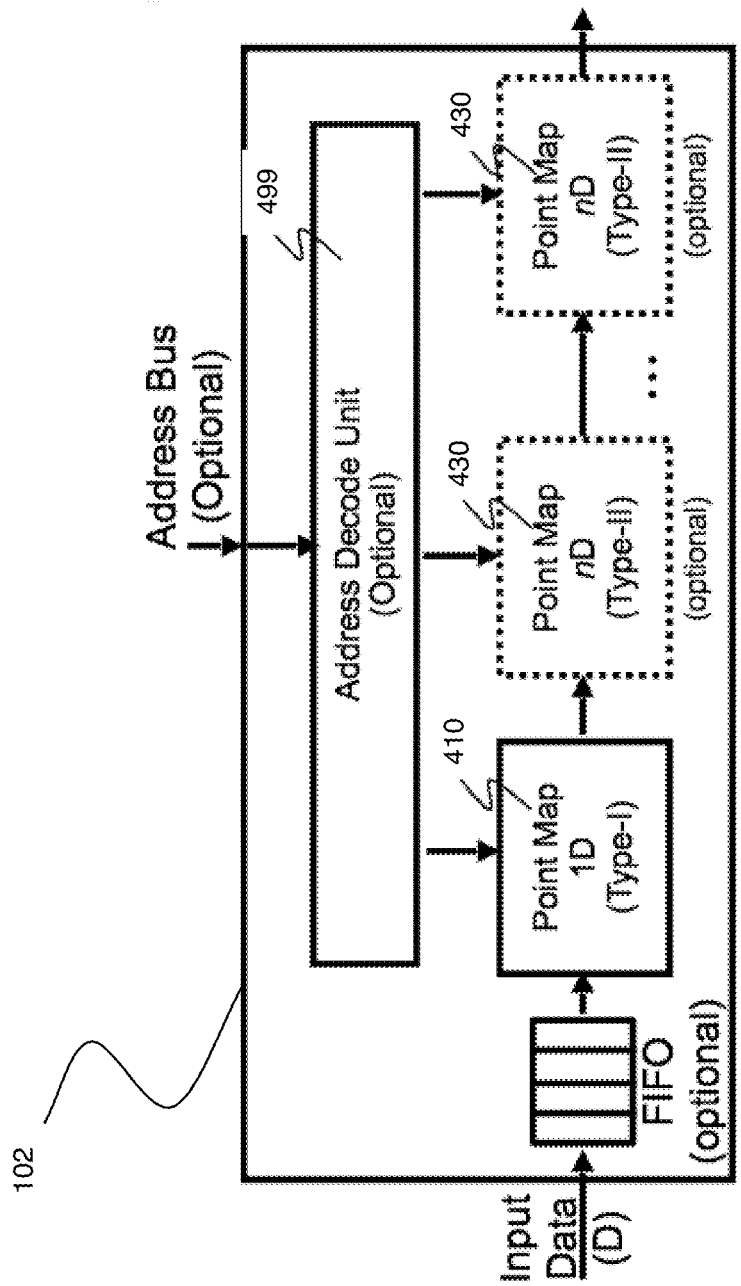
FIGS. 4A-4I depict block diagrams of the architecture of a point mapper, according to one embodiment.

Referring now to FIG. 4A, a point mapper 102 is shown to include a one-dimensional point map unit 410 receiving an input data stream. As an option, the point mapper 102 may include one or more of a FIFO buffer, an address decode unit 499, and one or more n-dimensional point map units 430.

In one embodiment, the one-dimensional point map unit 410 remaps one-dimensional data sources. As an option, the one-dimensional point map unit 410 may operate without internal buffer. The one-dimensional point map unit 410 may perform a remap of the points of an input data stream and output a result based on configurable parameters. The configurable parameters may include a mode, such as duplication or reduction. Also, the configurable parameters may include instructions that define a map of the input points of the input data stream to the output points of the result. The configurable parameters may be configured as microcode in a microcode memory.

Still yet, one or more n-dimensional point map units 430 may remap n-dimensional data sources. As an option, each n-dimensional point map unit 430 may operate with internal buffering. The optional FIFO buffer may be used for data buffering. Where the data stream input to the point mapper 102 is multi-dimensional, one-dimensional remapped points may be supplied to a first n-dimensional point map unit 430 from the one-dimensional point map unit 410, which may then remap dimensions of an increasing number. For example, a first n-dimensional point map unit 430 may remap into two dimensions, a second n-dimensional point map unit 430 may subsequently remap into three dimensions, etc.

Each of the n-dimensional point map units 430 may perform remapping based on configurable parameters, such as a mode (e.g., duplication or reduction), and/or instructions that define a map of the input points to the output points of the result.

Figure 4B:
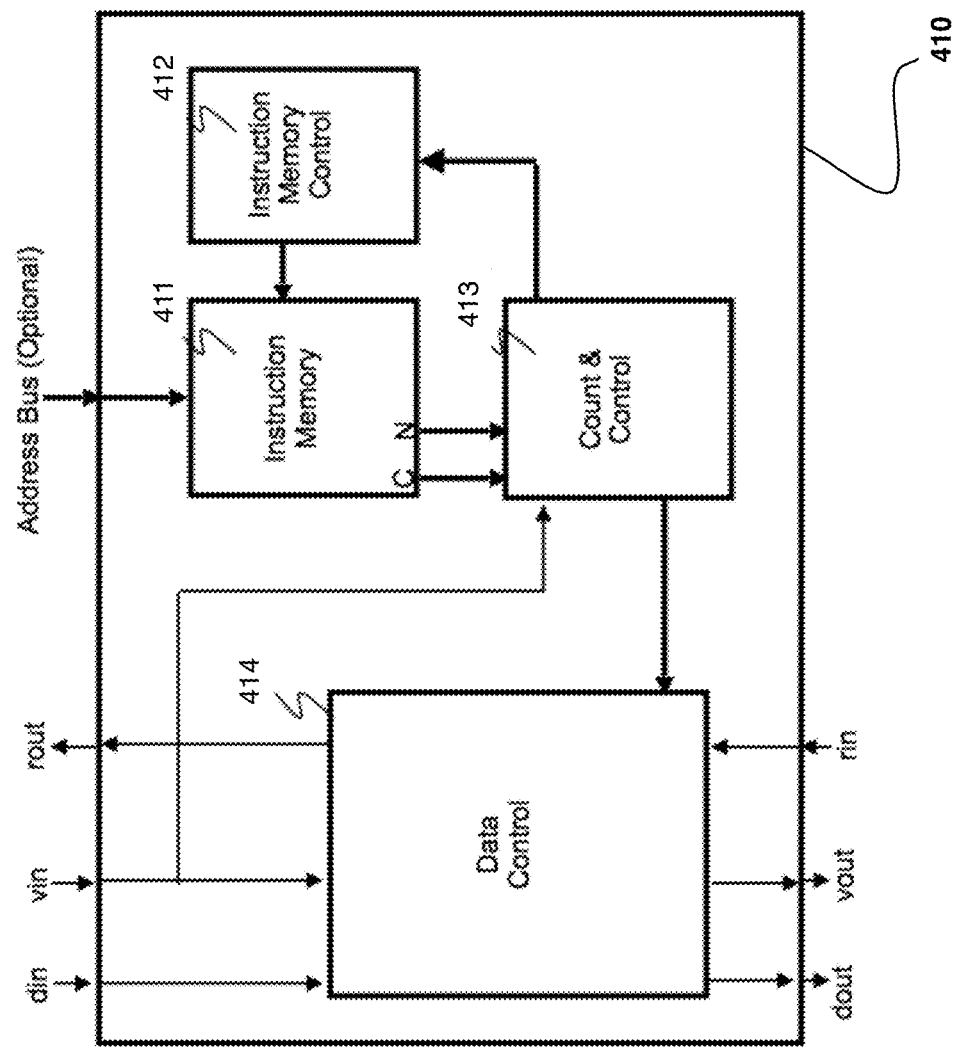

FIG. 4B shows a block diagram view of the one-dimensional point map unit 410. In particular, the one-dimensional point map unit 410 includes a data control unit 414, an instruction memory 411, a count & control unit 413, and an instruction memory control unit 412.

In one embodiment, the instruction memory 411 may be programmed via the address bus. In another embodiment, the instruction memory 411 may be pre-loaded, or may comprise Read-Only Memory (ROM).

In operation, a point arriving on the din interface may start the point duplication or reduction process. The instruction memory 411 provides the count & control unit 413 with the current and next instructions from the instruction memory 411. The data control unit 414 provides appropriate data on the dout interface based on the mode (i.e., duplication or reduction). The instruction memory control unit 412 indicates to the instruction memory 411 to fetch the next set of instructions, and the current and next instructions are loaded into the count & control unit 413, which then waits for the arrival of the next input point.

The inputs of din and yin, and the output of rout, define the input data interface and signaling used for transferring data to the one-dimensional point map unit 410. The outputs of dout, vout, and the input of rin, define the output data interface and signaling used for transferring data from the one-dimensional point map unit 410.

Figure 4C:
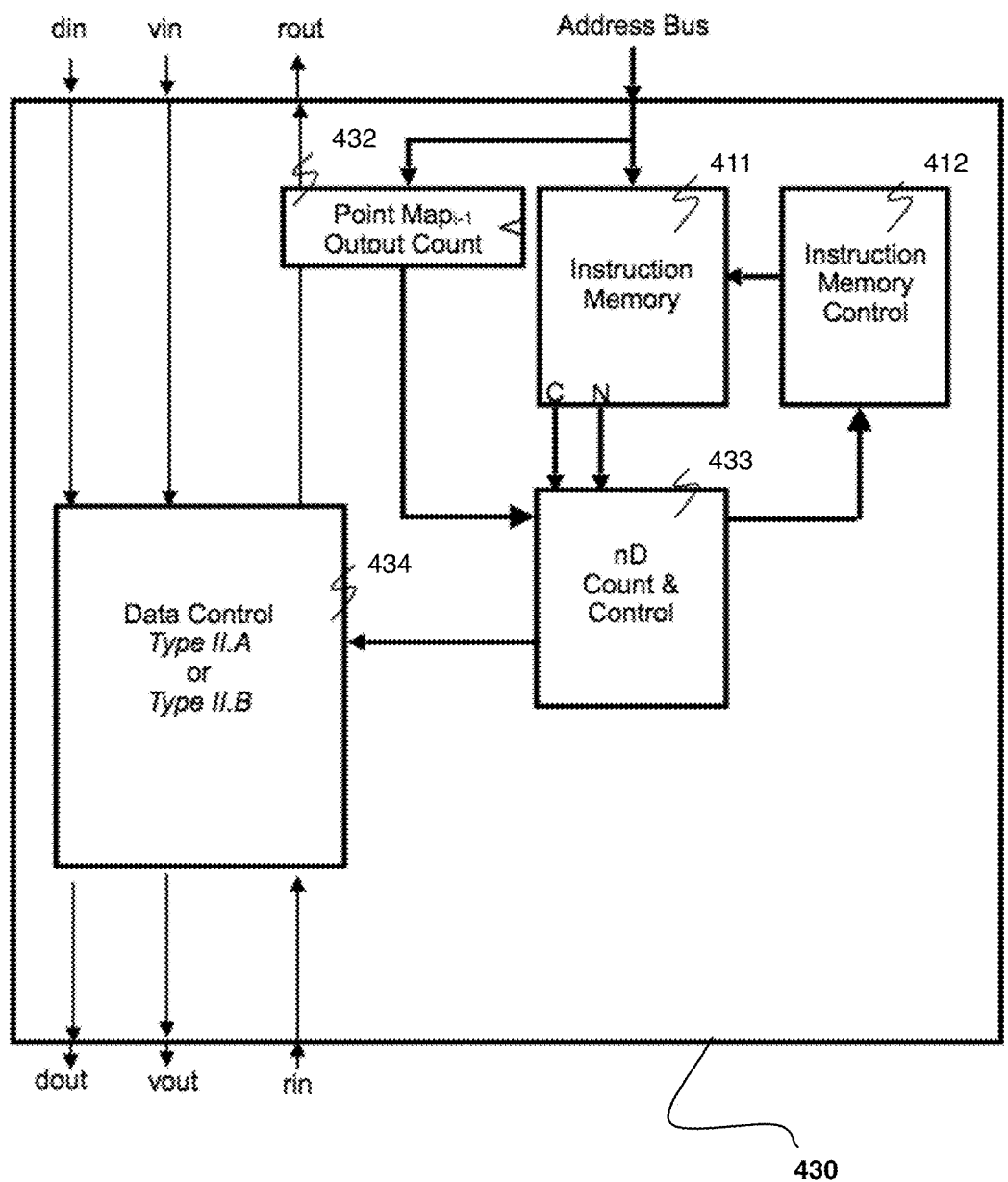

FIG. 4C shows a block diagram view of the n-dimensional point map unit 430. In particular, the n-dimensional point map unit 430 includes a data control unit 434, an instruction memory 411, an n-dimensional count & control unit 433, an instruction memory control unit 412, and a count register 432.

In one embodiment, the instruction memory 411 and the count register 432 may be programmed via the address bus. In another embodiment, the instruction memory 411 and the count register 432 may be pre-loaded, or may comprise Read-Only Memory (ROM).

In operation, input arriving on the din interface may start the point duplication or reduction process. The n-dimensional count & unit 433 is provided the current and next instructions from the instruction memory 411. The count register 432 is loaded with the value from the preceding point map unit.

Based on the current instructions, the n-dimensional count & control unit 433 provides inputs to the data control unit 434 to assist determining next actions. Thus, the data control unit 434 provides appropriate data on the dout interface based on the mode. The current and next instructions are loaded into the n-dimensional count & control unit 433, which then waits for the arrival of the next input point.

In a duplication mode, n-dimensional data streams may be duplicated into multiple n-dimensional data streams. In a reduction mode, multiple n-dimensional data streams may be reduced into a single n-dimensional data stream.

Figure 4D:
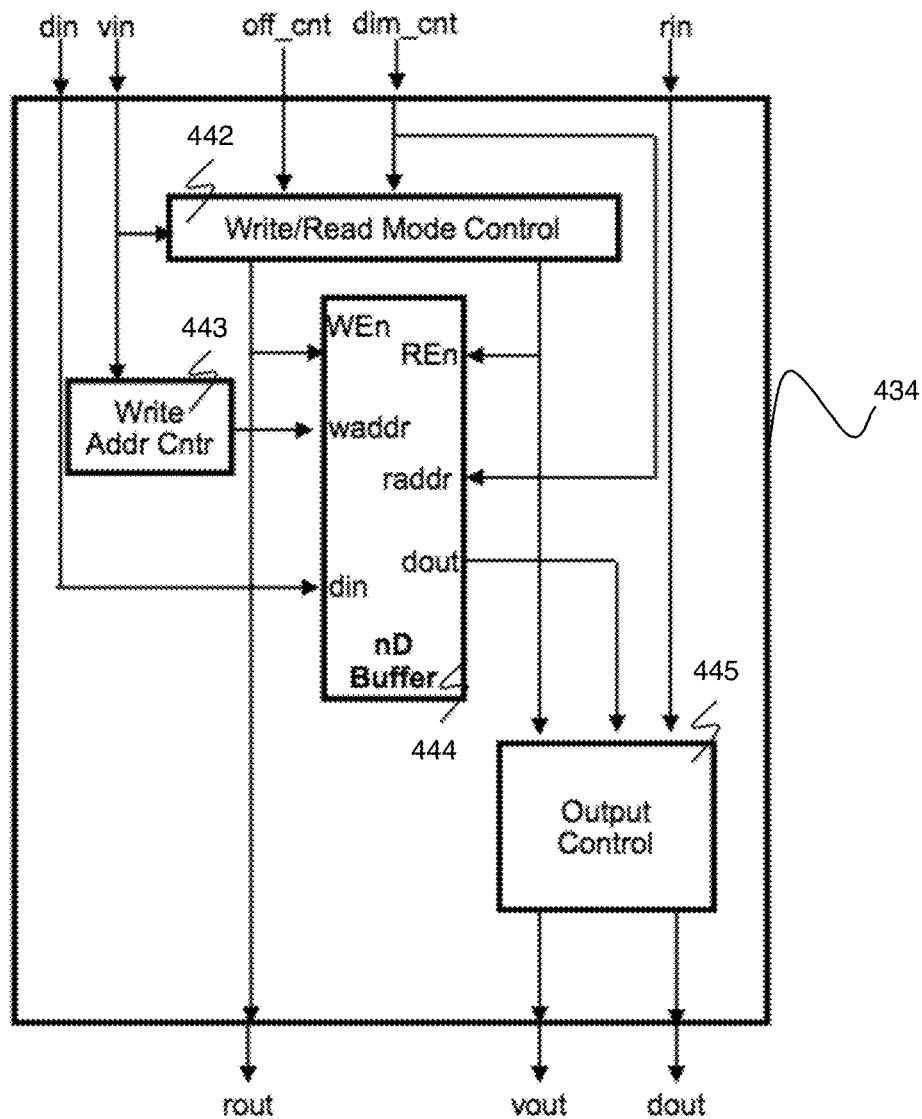

FIG. 4D shows a block diagram view of the data control unit 434 of Type II.A architecture. As shown in FIG. 4D, the data control unit 434 includes an output control unit 445, an n-dimensional buffer 444, a write address counter 443, and a write/read mode control unit 442. As an option, the write/read mode control unit 442 may be initially configured to operate in write mode. When data is present at input din, the data is written to the n-dimensional buffer 444 in an incremental fashion with write address counter 443 controlling the write addressing. Once write/read mode control unit 442 determines that all data has been written for the current dimension (dim_cnt), the write/read mode control unit 442 switches to read mode. Next, rout is de-asserted by write/read mode control unit 442.

When the remapping operation is a reduction, points may be dropped from input data streams and not stored during intermediate steps. However, when the remapping operation is a duplication, input units may need to be stored so that the input units can be properly duplicated to the output stream. The n-dimensional buffer 444 may be used to buffer input units between dimensional operations. Accordingly, the n-dimensional buffer 444 may be sized according to the N-dimension. For example, if the input unit includes 1,000 points to enter in the Y-dimension, then the n-dimensional buffer 444 may include 1,000 entries.

In read mode, data is provided from the n-dimensional buffer 444 to the output control unit 445 with dim_cnt controlling the read address. Data is supplied sequentially out of the n-dimensional buffer 444, and output control unit 445 ensures vout and dout are synchronized at the output. The n-dimensional buffer 444 read process is repeated off cnt times (i.e., based on the offset field of the current instruction). Once all necessary data has been read out of the n-dimensional buffer 444, write/read mode control unit 442 switches back to write mode and rout is asserted.

Figure 4E:
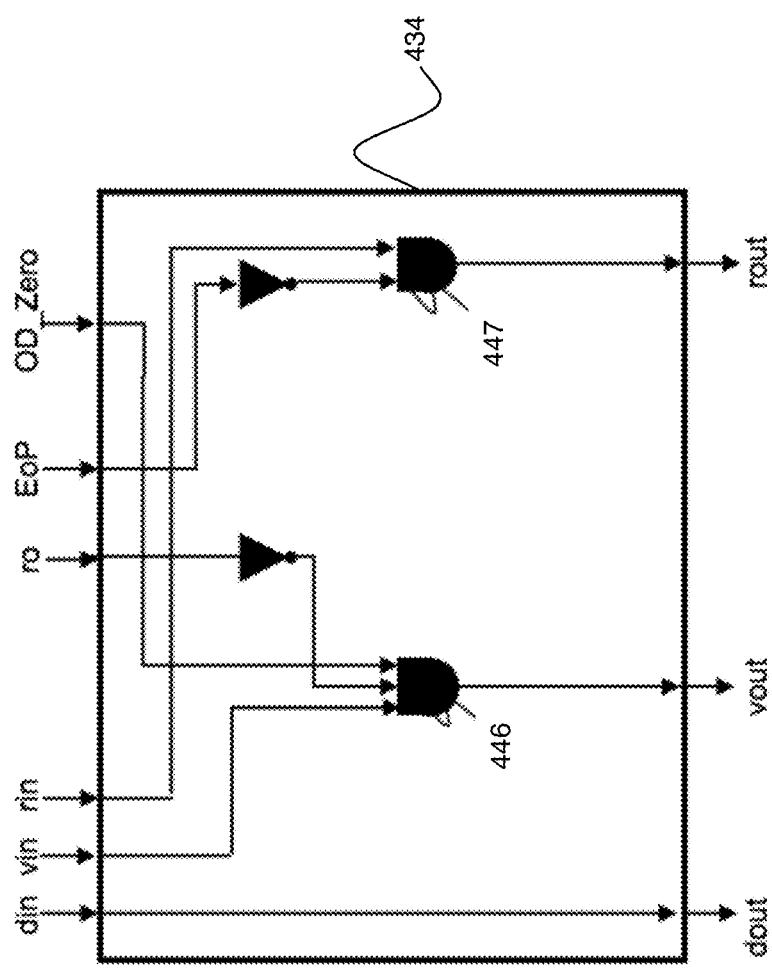

FIG. 4E shows a block diagram view of the data control unit 434 of Type II.B architecture. As shown in FIG. 4E, the data control unit 434 (of Type II.B architecture) includes AND gates 446 and 447. In operation, vout of the AND gate 446 is OD_Zero and !ro and vin. Further, rout of the AND gate 447 is !EoP and rin. The dout input is passed through.

Figure 4F:
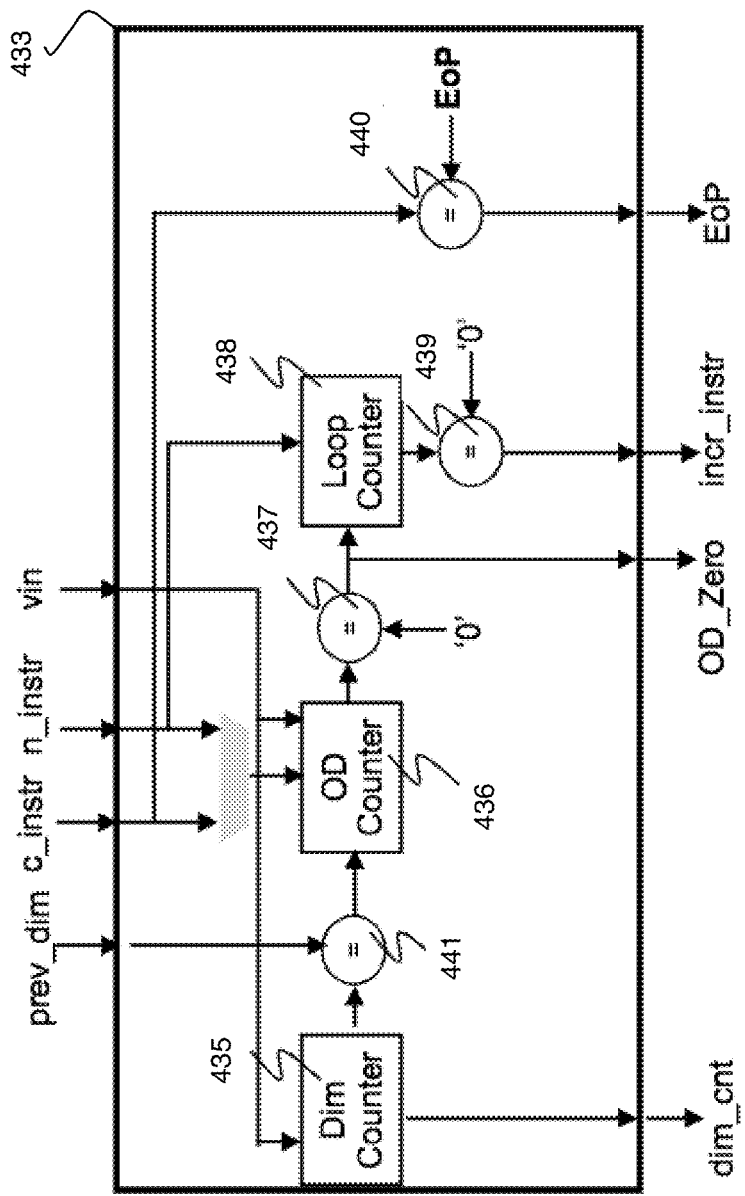

FIG. 4F shows a block diagram view of the n-dimensional count & control unit 433. As shown in FIG. 4F, the n-dimensional count & control unit 433 includes a dimension counter 435, an offset/duplicate counter 436, a loop counter 438, and increment/decrement logic 437, 439, 440, and 441.

The dimension counter 435 is loaded with 0×0, and then reloaded when prev_dim is reached. The offset/duplicate counter 436 is loaded with the appropriate instruction field based on mode. As an option, the mode may include a duplication mode (duplicate count), or a reduction mode (offset). The c_instr input is used under the condition of dimension counter 435==prev_dim and offset/duplicate counter 436==0. The n_instr input is used under the condition of dimension counter 435==prev_dim and offset/duplicate counter 436==0 and loop counter 438==0. Additionally, under the condition of dimension counter 435==0 and offset/duplicate counter 436==0 and the loop counter 438==0, the loop counter 438 is loaded with the loop count instruction field.

When vin is asserted, the dimension counter 435 increments. If the dimension counter 435==prev_dim, the dimension counter 435, via the increment/decrement logic 441, asserts a decrement signal to the offset/duplicate counter 436. If the offset/duplicate counter 436==0, the offset/duplicate counter 436, via the increment/decrement logic 437, asserts a decrement signal to the loop counter 438. The OD_Zero is driven '1' when the offset/duplicate counter 436==0. Otherwise, the OD_Zero is '0'. OD_Zero is provided to the data control unit 434.

Also, incr_instr is driven '1', via the increment/decrement logic 439, when the loop counter 438==0. The incr_instr signal is provided to the instruction memory control unit 412. Finally, end of program (EoP) is driven '1', via the increment/decrement logic 440, when n_instr==the EoP indicator. As noted above, the EoP indicator may equal the 0xFFFF instruction.

Figure 4G:
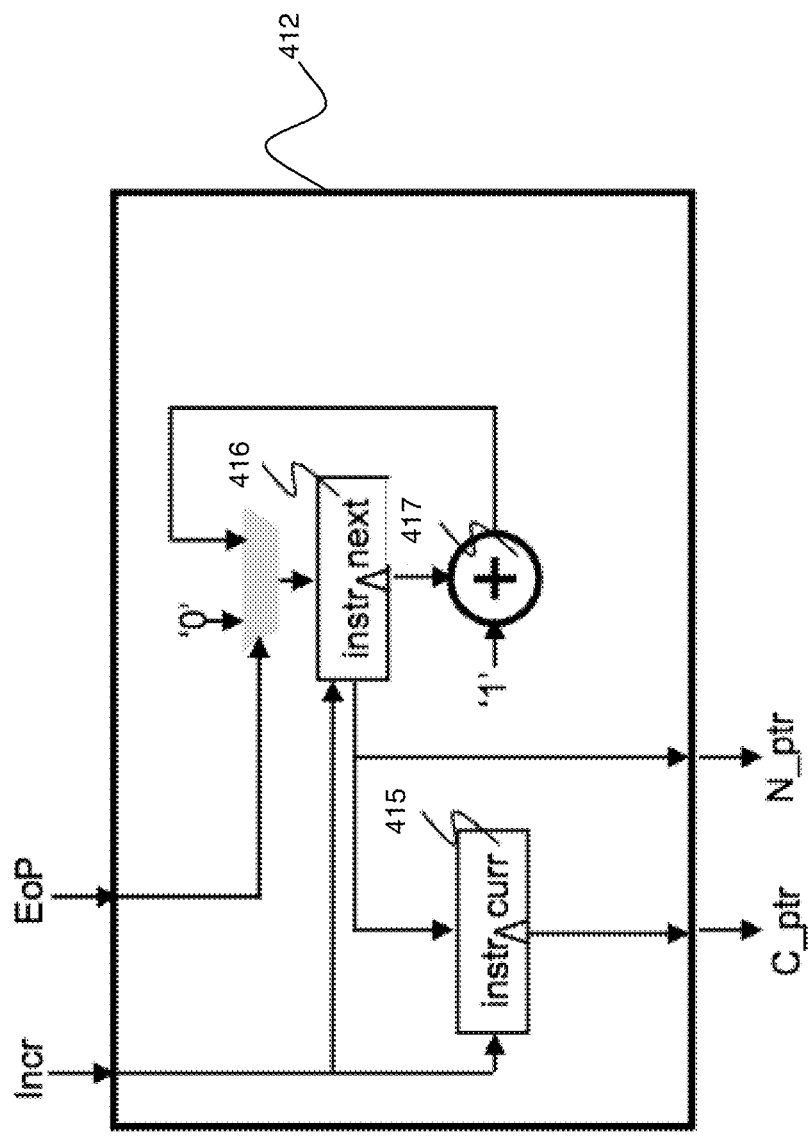

FIG. 4G shows a block diagram view of the instruction memory control unit 412. As shown in FIG. 4G, the instruction memory control unit 412 includes a current instruction pointer 415 and a next instruction pointer 416. The C_ptr output provides the current instruction pointer in instruction memory, and the N_ptr output provides the next instruction pointer in the instruction memory. The instruction memory may store microcode instructions for performing a remapping operation, as described above.

When Incr is asserted, the next instruction is incremented via 417 and latched at the next instruction pointer 416. The current instruction is latched from next instruction before the increment occurs. When the EoP input is asserted, the next instruction pointer 416 is reset to 0×0.

Figure 4H:
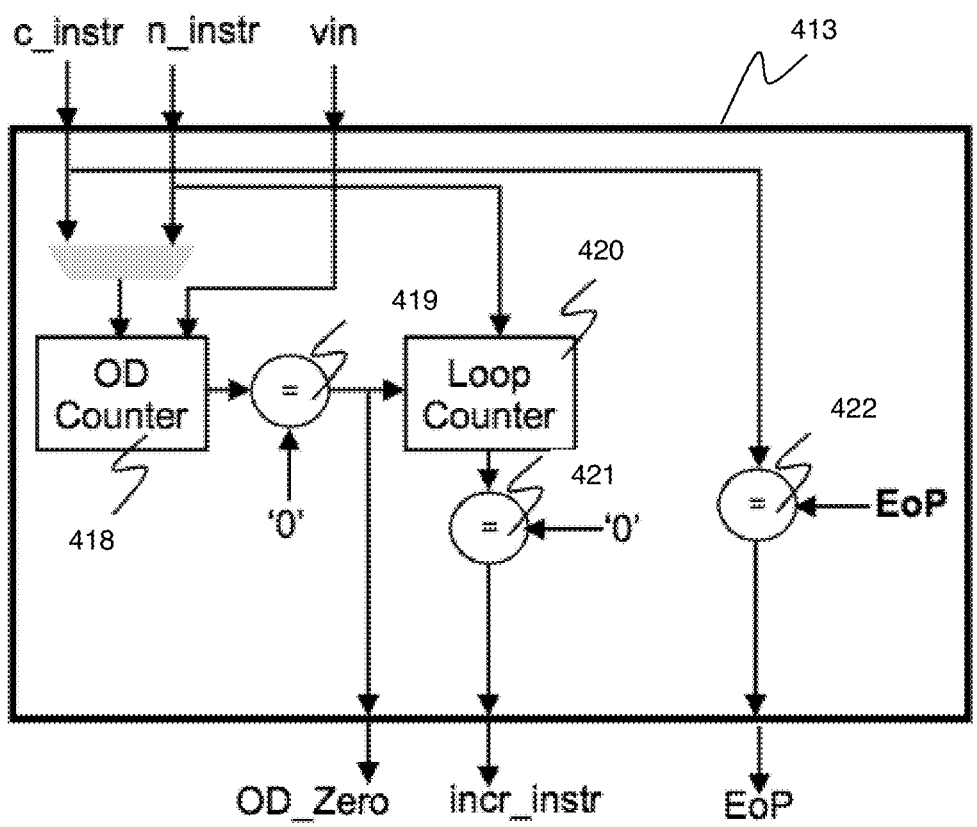

FIG. 4H shows a block diagram view of the count & control unit 413. As shown in FIG. 4H, the count & control unit 413 includes an offset/duplicate counter 418, a loop counter 420, and increment/decrement logic 419, 421, and 422.

In operation, the offset/duplicate counter 418 is loaded with the appropriate instruction field based on mode. As an option, the mode may include a duplication mode (duplicate count), or a reduction mode (offset). The c_instr input is used under the condition of offset/duplicate counter 418==0. The n_instr input is used under the condition of offset/duplicate counter 418==0 and loop counter 420==0.

The loop counter 420 is loaded with the loop count instruction field when the offset/duplicate counter 418==0 and the loop counter 420==0. When vin is asserted, the offset/duplicate counter 418 decrements. If the offset/duplicate counter 418==0, the offset/duplicate counter 418 asserts, via the increment/decrement logic 419, a decrement signal to the loop counter 420.

The output signal OD_Zero is driven '1' when the offset/duplicate counter 418==0, otherwise the output signal OD_Zero is driven '0'. The output signal OD_Zero is provided to the data control unit 414. The output signal incr_instr is driven '1', via the increment/decrement logic 421, when the loop counter 420==0. The output signal incr_instr is provided to the instruction memory control unit 412. Finally, end of program (EoP) is driven '1', via the increment/decrement logic 422, when n_instr==the EoP indicator. As noted above, the EoP indicator may equal the 0xFFFF instruction.

Figure 4I:
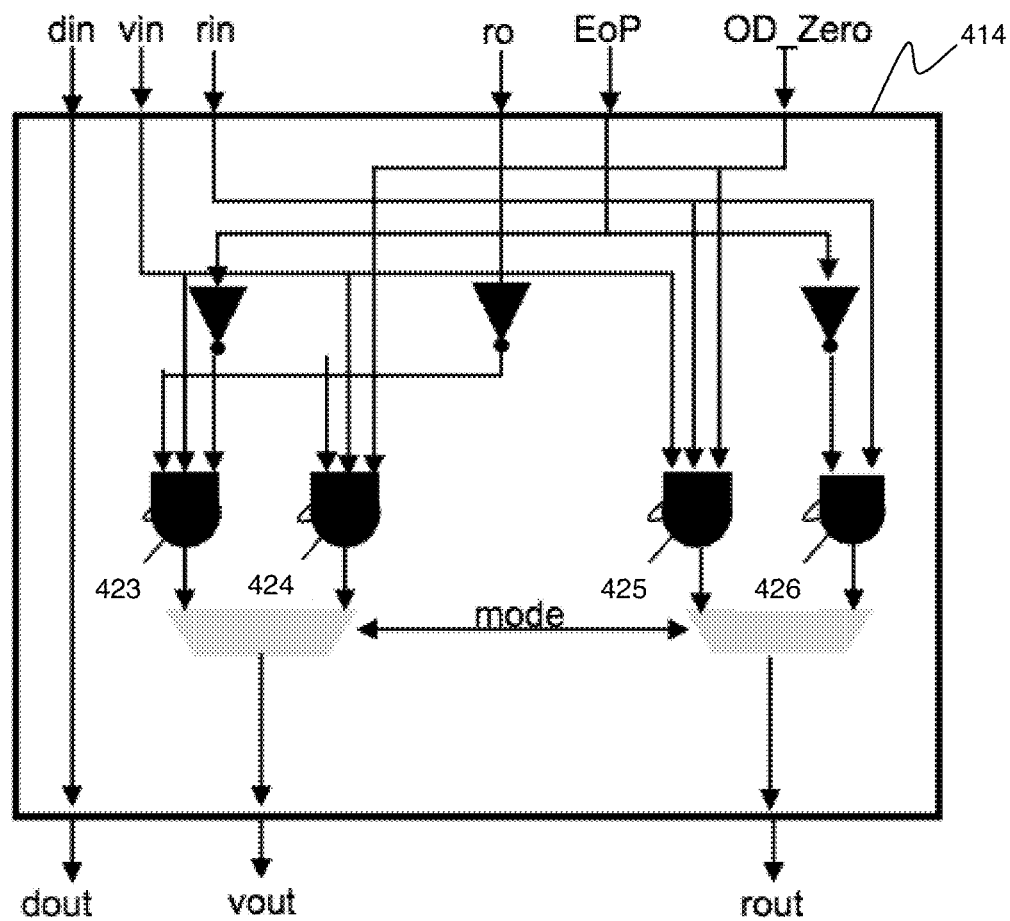

FIG. 4I shows a block diagram view of the data control unit 414. As shown in FIG. 4I, the data control unit 414 includes AND gates 423, 424, 425, and 426.

During operation of the data control unit 414, vout is selected based on mode. As an option, the mode may include a duplication mode, or a reduction mode. If in the duplication mode, the AND gate 423 operates on !ro and !EoP and vin. If in the reduction mode, the AND gate 424 operates on OD_Zero and !ro and vin.

Also, rout is selected based on the mode. If in the duplication mode, the AND gate 425 operates on OD_Zero and vin and rin. If in the reduction mode, the AND gate 426 operates on !EoP and rin. As illustrated, the dout signal is pass through.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving data comprising a data stream, where the data stream includes a plurality of data points that represent a data source, where the data stream has a first length indicated by a first number of the plurality of data points;
identifying, at a programmable instruction memory, a first instruction, the first instruction including:
a first field indicating whether a next received data point is passed on as output to a remapped data stream, the first field including a bit that indicates whether duplication is performed for the next received data point, where the bit, when set to a predetermined value, indicates that a read operation is performed on the next received data point, but the next received data point is not moved to the remapped data stream,
a second field indicating a number of the plurality of data points that the first instruction applies to, the second field including a loop count value that indicates a number of times the first instruction is executed before an instruction pointer is incremented, and
a third field indicating a number of instances of duplication to be performed, the third field including a duplicate count value that indicates a number of instances of duplication to be applied to the next received data point,
remapping the data stream to create the remapped data stream according to the first instruction, the remapping including modifying the plurality of data points in the data stream to create the remapped data stream so that the remapped data stream has a second length different from the first length, where the data stream has a first dimensionality, and the remapped data stream has a second dimensionality that is greater than the first dimensionality; and
sending the remapped data stream to be processed.

2. The computer-implemented method of claim 1, wherein the first instruction indicates each of the plurality of data points that are to be selected and mapped in the remapped data stream.

3. The computer-implemented method of claim 1, wherein in response to determining that the first field has a value of zero, the second field has a value of zero, and the third field has a value of zero, duplication is performed for the next received data point, for only the next received data point, and the next received data point is duplicated once.

4. The computer-implemented method of claim 1, wherein the first field, the second field, and the third field are configurable parameters of the first instruction.

5. The computer-implemented method of claim 1, wherein the modifying includes performing a point-to-point computation that maps one or more of the plurality of data points in the data stream to another plurality of points in the remapped data stream.

6. A computer program product for programmable point mapping, the computer program product comprising a computer readable storage medium having program instructions embodied therewith, where the computer readable storage medium is not a transitory signal per se, and where the program instructions are executable by a point mapper to cause the point mapper to:
receive, by the point mapper, a data stream, where the data stream includes a plurality of data points that represent a data source, where the data stream has a first length indicated by a first number of the plurality of data points;
identify, at a programmable instruction memory, a first instruction, the first instruction including:
a first field indicating whether a next received data point is passed on as output to a remapped data stream, the first field including a bit that indicates whether duplication is performed for the next received data point, where the bit, when set to a predetermined value, indicates that a read operation is performed on the next received data point, but the next received data point is not moved to the remapped data stream,
a second field indicating a number of the plurality of data points that the first instruction applies to, the second field including a loop count value that indicates a number of times the first instruction is executed before an instruction pointer is incremented, and
a third field indicating a number of instances of duplication to be performed, the third field including a duplicate count value that indicates a number of instances of duplication to be applied to the next received data point;
remap, by the point mapper, the data stream to create the remapped data stream according to the first instruction, the remapping including modifying the plurality of data points in the data stream to create the remapped data stream so that the remapped data stream has a second length different from the first length, where the data stream has a first dimensionality, and the remapped data stream has a second dimensionality that is greater than the first dimensionality; and
send, by the point mapper, the remapped data stream to be processed.

7. The computer program product of claim 6, wherein the first instruction indicates each of the plurality of data points that are to be selected and mapped in the remapped data stream.

8. A system, comprising:
a hardware processor; and
logic integrated with the hardware processor, executable by the hardware processor, or integrated with and executable by the hardware processor, the logic being configured to cause the hardware processor to:
receive a data stream, where the data stream includes a plurality of data points that represent a data source, where the data stream has a first length indicated by a first number of the plurality of data points;
identify, at a programmable instruction memory, a first instruction, the first instruction including:
a first field indicating whether a next received data point is passed on as output to a remapped data stream, the first field including a bit that indicates whether duplication is performed for the next received data point, where the bit, when set to a predetermined value, indicates that a read operation is performed on the next received data point, but the next received data point is not moved to the remapped data stream,
a second field indicating a number of the plurality of data points that the first instruction applies to, the second field including a loop count value that indicates a number of times the first instruction is executed before an instruction pointer is incremented, and a third field indicating a number of instances of duplication to be performed, the third field including a duplicate count value that indicates a number of instances of duplication to be applied to the next received data point;

remap the data stream to create the remapped data stream according to the first instruction, the remapping including modifying the plurality of data points in the data stream to create the remapped data stream so that the remapped data stream has a second length different from the first length, where the data stream has a first dimensionality, and the remapped data stream has a second dimensionality that is greater than the first dimensionality; and send the remapped data stream to be processed.

9. The system of claim 8, wherein the first instruction indicates each of the plurality of data points that are to be selected and mapped in the remapped data stream.

10. The system of claim 8, wherein the first field, the second field, and the third field are configurable parameters of the first instruction.

11. A computer-implemented method, comprising:

receiving data comprising a data stream, where the data stream includes a plurality of data points that represent a data source, where the data stream has a first length indicated by a first number of the plurality of data points;

identifying, at a programmable instruction memory, a first instruction, the first instruction including:
 a first field indicating whether a next received data point is passed on as output to a remapped data stream,
 a second field indicating a number of the plurality of data points that the first instruction applies to, and
 a third field indicating a number of instances of duplication to be performed remapping the data stream to create the remapped data stream according to the first instruction, the remapping including modifying the plurality of data points in the data stream to create the remapped data stream so that the remapped data stream has a second length different from the first length; and sending the remapped data stream to be processed;

wherein in response to determining that the first field has a value of zero, the second field has a value of zero, and the third field has a value of zero, duplication is performed for the next received data point, for only the next received data point, and the next received data point is duplicated once.

* * * * *